United States Patent
R N (10) Patent No.: US 11,919,576 B2
(45) Date of Patent: Mar. 5, 2024

(54) PANEL SYSTEMS, STRUCTURES, AND VEHICLES HAVING AN ADJUSTABLE CABLE

(71) Applicant: Rivian IP Holdings, LLC, Plymouth, MI (US)

(72) Inventor: Arun Kumar R N, Troy, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 17/702,278

(22) Filed: Mar. 23, 2022

(65) Prior Publication Data
US 2023/0303190 A1  Sep. 28, 2023

(51) Int. Cl.
*B62D 33/03* (2006.01)
*B62D 33/027* (2006.01)
*E05C 17/36* (2006.01)

(52) U.S. Cl.
CPC ......... *B62D 33/0273* (2013.01); *B62D 33/03* (2013.01); *E05C 17/36* (2013.01)

(58) Field of Classification Search
CPC ..... B62D 33/0273; B62D 33/03; E05C 17/36; E05Y 2900/544; E05Y 2900/546; Y10T 24/1498
See application file for complete search history.

(56) References Cited

U.S. PATENT DOCUMENTS

| | | | |
|---|---|---|---|
| 6,951,358 B1 * | 10/2005 | Ousley | B62D 33/0273 296/26.11 |
| 9,174,684 B1 * | 11/2015 | Waskie | B62D 33/03 |
| 9,278,718 B1 * | 3/2016 | Cooper | E05C 17/36 |
| 2005/0212320 A1 * | 9/2005 | Ousley | B62D 33/0273 296/57.1 |
| 2005/0251968 A1 * | 11/2005 | Ousley | B62D 33/0273 24/16 PB |
| 2008/0100084 A1 * | 5/2008 | Ohly | B62D 33/0273 296/57.1 |
| 2011/0089711 A1 * | 4/2011 | Zielinsky | B62D 33/0273 296/57.1 |
| 2011/0121602 A1 * | 5/2011 | Zielinsky | E05C 17/36 296/57.1 |
| 2011/0163565 A1 * | 7/2011 | Zielinsky | B62D 33/0273 296/57.1 |

(Continued)

Primary Examiner — Gregory A Blankenship
(74) Attorney, Agent, or Firm — BAKERHOSTETLER (57) ABSTRACT

Various disclosed embodiments include illustrative panel systems, structures, and vehicles. In an illustrative embodiment, a panel system includes a panel configured to rotatably connect to a structure and a panel cable assembly. The panel cable assembly includes a first cable having a first end and a second end, a first connector couplable to the first end of the first cable and the panel or the structure. The panel cable assembly also includes a second connector couplable to the second end of the first cable and the panel or the structure. The second connector is configured to have a predefined number of orientations. The second connector includes an outer portion coupled to the first cable and an inner portion received within the outer portion in one of the predefined number of orientations. Each of the predefined number of orientations results a different distance value between the panel and the structure responsive to full extension of the cable.

17 Claims, 5 Drawing Sheets

(56) References Cited

U.S. PATENT DOCUMENTS

| | | | |
|---|---|---|---|
| 2011/0181068 A1* | 7/2011 | Zielinsky | B62D 33/0273 296/57.1 |
| 2015/0115644 A1* | 4/2015 | Waskie | B62D 33/0273 296/57.1 |
| 2020/0240184 A1* | 7/2020 | Hemphill | E05C 17/365 |
| 2022/0063735 A1* | 3/2022 | Dzurnak | B62D 33/0273 |

* cited by examiner

PANEL SYSTEMS, STRUCTURES, AND VEHICLES HAVING AN ADJUSTABLE CABLE

INTRODUCTION

The present disclosure relates to tailgates or panels that function similar to tailgates. The statements in this section merely provide background information related to the present disclosure and may not constitute prior art.

During pick-up truck construction one side of a tailgate cable is typically looser once the tailgate has been mounted to the truck body. This is a result of build variations of the body and the tailgate.

BRIEF SUMMARY

Various disclosed embodiments include illustrative panel systems, structures, and vehicles.

In an illustrative embodiment, a panel system includes a panel configured to rotatably connect to a structure and a panel cable assembly. The panel cable assembly includes a first cable having a first end and a second end, a first connector couplable to the first end of the first cable and the panel or the structure. The panel cable assembly also includes a second connector couplable to the second end of the first cable and the panel or the structure. The second connector is configured to have a predefined number of orientations. The second connector includes an outer portion coupled to the first cable and an inner portion received within the outer portion in one of the predefined number of orientations. Each of the predefined number of orientations results a different distance value between the panel and the structure responsive to full extension of the cable.

In another illustrative embodiment, a structure includes a first wall, a second wall, a base connected between the first wall and the second wall. The structure includes a panel system that includes a panel having a base configured to rotatably connect to the first wall and the second wall. The structure also includes a panel cable assembly that includes a first cable having a first end and a second end, a first connector couplable to the first end of the first cable and the panel or the first wall, and a second connector couplable to the second end of the first cable and the panel or the first wall. The second connector is configured to have a predefined number of orientations. The second connector includes an outer portion coupled to the first cable and an inner portion received within the outer portion in one of the predefined number of orientations. Each of the predefined number of orientations results a different distance value between the panel and the first wall responsive to full extension of the first cable.

In another illustrative embodiment, a vehicle includes a first bed wall, a second bed wall, a bed connected between the first bed wall and the second bed wall, a tailgate including a base configured to rotatably connect to first bed wall and the second bed wall, and a tailgate cable assembly. The tailgate cable assembly includes a first cable having a first end and a second end, a first eyelet connector couplable to the first end of the first cable and the tailgate or the first bed wall, and a second eyelet connector couplable to the second end of the first cable and the tailgate or the first bed wall. The second eyelet connector is configured to have a predefined number of orientations. The second eyelet connector includes an eyelet coupled to the second cable and a washer received within the eyelet in one of the predefined number of orientations, Each of the predefined number of orientations results a different positions of the tailgate responsive to full extension of the first cable.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings generally indicate like elements.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various disclosed embodiments include illustrative panel systems, structures, and vehicles. As will be explained below, such embodiments allow one to set different cable lengths for use with gravity weight tailgate or panel systems.

Figure 1:
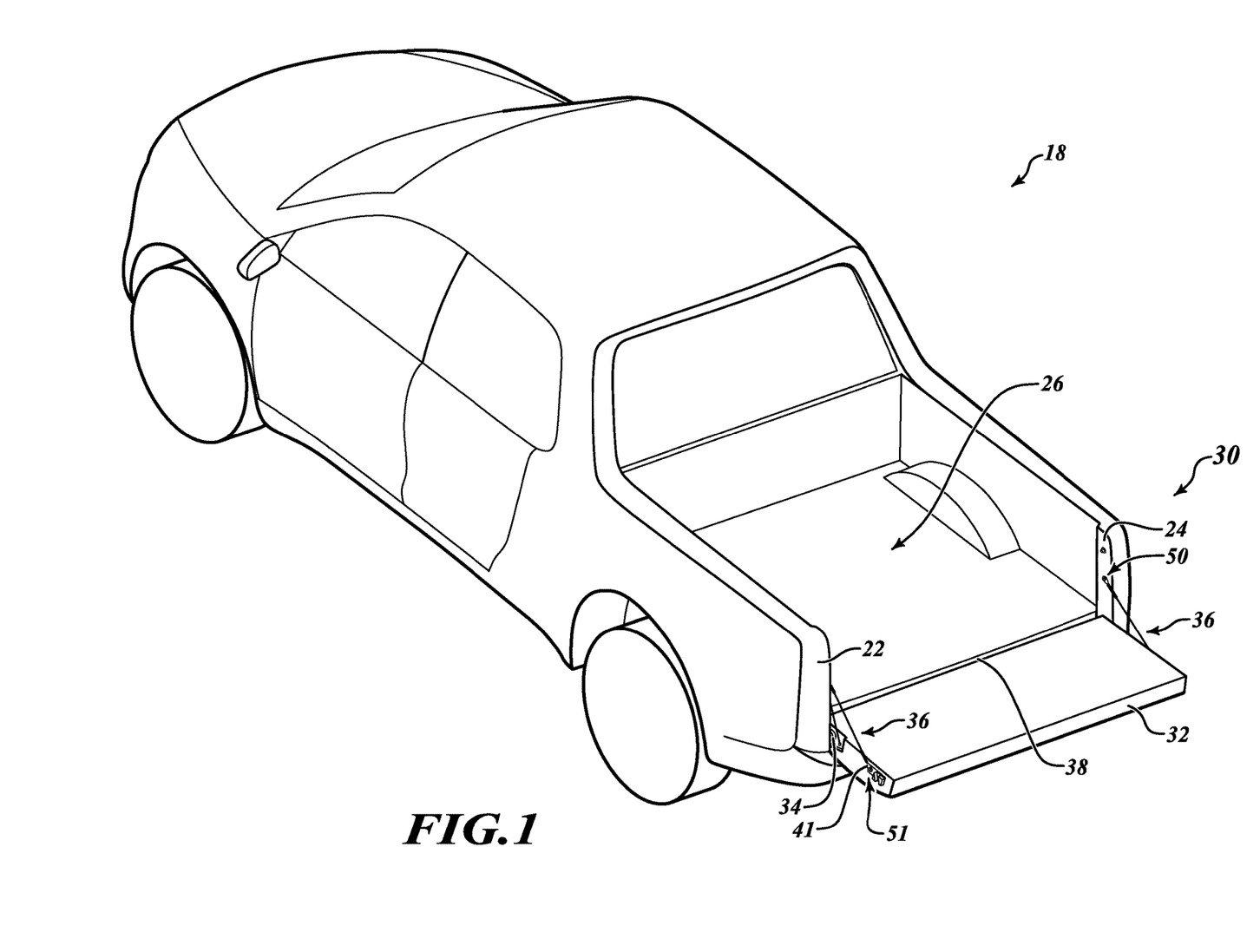
FIG. 1 is a perspective view of a structure incorporating a panel cable assembly.

Given by way of non-limiting overview and referring to FIG. 1, in various embodiments, a structure (vehicle) 18 includes a first wall 22, a second wall 24, a base (bed) 26, and a panel (tailgate) system 30. The base 26 is connected between bases of the first wall 22 and the second wall 24 The panel system 30 includes a panel 32 having a base 38 that is rotatably connected to the first wall 22 and the second wall 24 at a connection point 34. The panel system 30 also includes panel cable assemblies 36 that is mounted at ends to the panel 32 and at another end to one of the first wall 22 or the second wall 24. The panel cable assemblies 36 has multiple attachment orientations that allow the panel cable assemblies 36 to have different lengths depending upon the orientation. Thus, in a situation where the distance between the walls 22 and 24 and the panel 32 are not identical, the panel cable assemblies 36 attached to the panel (tailgate) 32 may be adjusted in length in order for the panel cable assemblies 36 to display similar tension.

Now that an overview has been presented by way of illustration only and not of limitation, details will be set forth by way of non-limiting examples given by way of illustration only and not of limitation. First, one of the illustrative panel cable assemblies 36 will be explained by way of non-limiting examples given by way of illustration only.

As shown in FIGS. 1-7, in various embodiments, the illustrative structure 18 is configured to allow for adjustable lengths for the panel cable assembly 36. The panel cable assembly 36 includes a cable 37 having a first end and a second end, a first connector 41, and a second connector 40. The first connector 41 is connectable to the first end of the cable 37 and the panel 32 at a panel/cable connection point 51. The second connector 40 is connectable to the second end of the cable 37 and one of the first wall 22 and the second wall 24 at a wall/cable connection point 50. The second connector 40 is configured to have a predefined number of orientations. Each of the orientations results a different distance value between the panel 32 and the walls 22, 24 of the structure 18 when the panel 32 is in an opened position with the cable 37 fully extended. In the illustrative embodiment, the panel 32 rotates about the connection point 34 due to gravity. The differences between the different distance values may be a few millimeters to a several centimeters or larger depending upon the application.

In various embodiments, as shown in FIGS. 2-5, the second connector 40 includes an outer portion 42 coupled to the cable 37 and an inner portion 44 received within the outer portion 42 in two or more (a predefined number of) orientations. In one illustrative example, the inner portion 44 is an oval-shaped and the outer portion 42 includes an oval-shaped inner cavity capable of receiving the inner portion 44. The inner portion 44 includes a bolt cavity (hole) that is disposed closer to a first end than a second end of the inner portion 44. In this embodiment, the inner portion 44 may have two different orientations within the outer portion 42. Other geometric shapes may be used for providing various orientations between the outer portion 42 and the inner portion 44.

Figure 2:
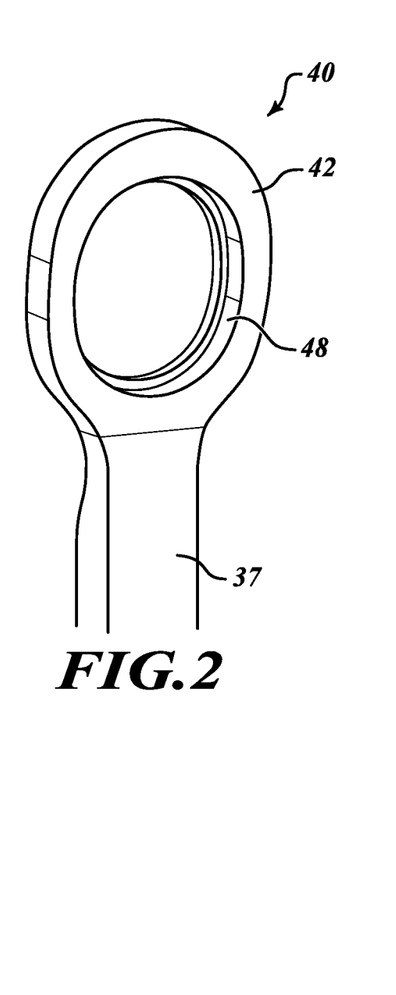
FIG. 2 is a perspective view of outer portion of an adjustable end of the panel cable assembly in FIG. 2.
Figure 3:
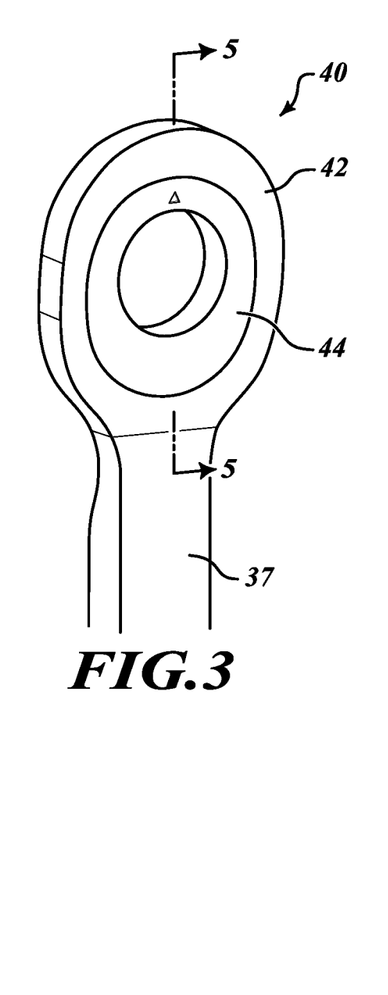
FIG. 3 is a perspective view of the adjustable end of FIG. 2 in a first configuration.
Figure 4:
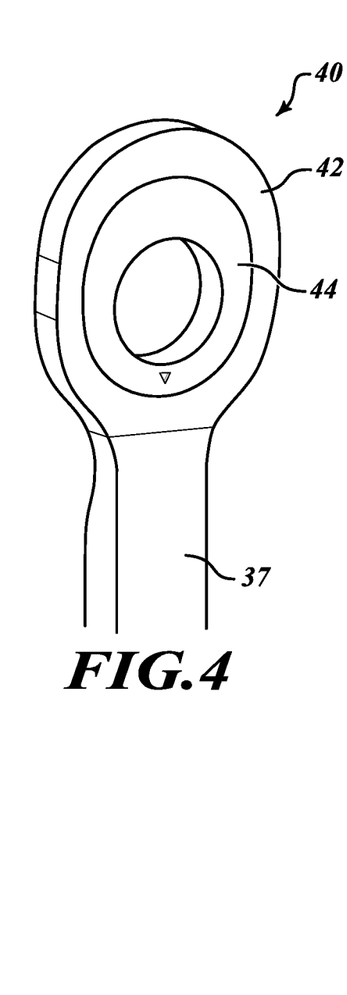
FIG. 4 is a perspective view of the adjustable end of FIG. 3 in a second configuration.
Figure 5:
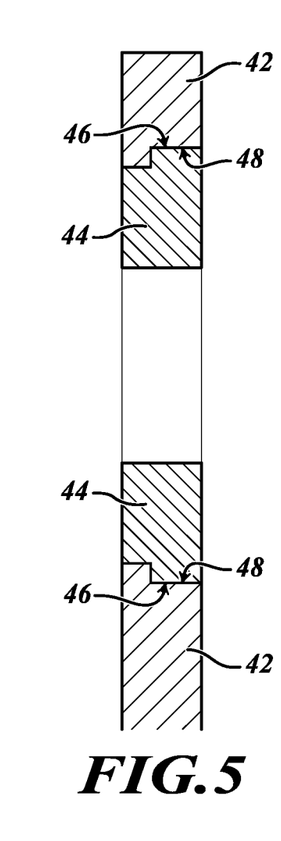
FIG. 5 is a cross-section view of the adjustable end of FIG. 3.
Figure 6:
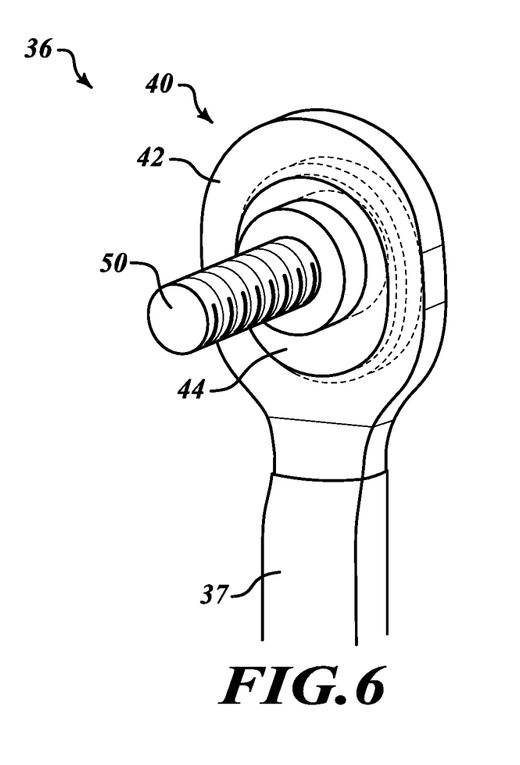
FIG. 6 is a perspective view of the adjustable end of the panel cable assembly in the first configuration with an shoulder bolt.
Figure 7:
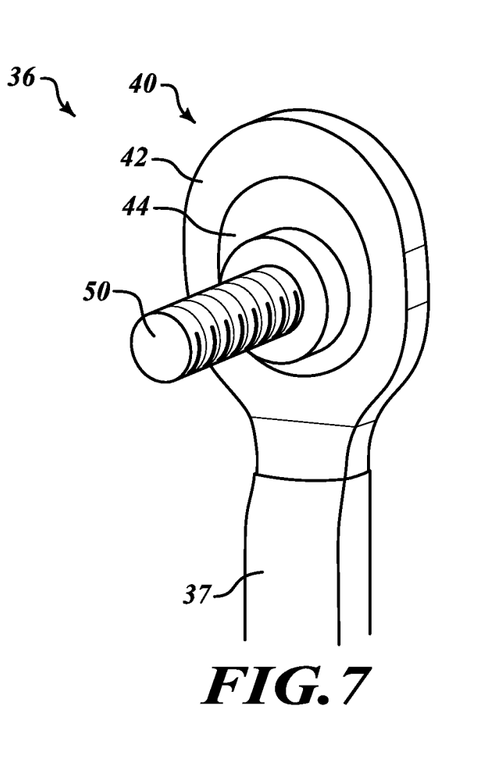
FIG. 7 is a perspective view of the adjustable end of the panel cable assembly in the second configuration with the shoulder bolt.

In various embodiments, as shown in FIGS. 2 and 5, the inner portion 44 includes an annular extension 46 and the outer portion 42 includes an annular relief 48 configured to receive the annular extension of the inner portion 44. A top surface of the inner portion 44 is flush with a top surface of the outer portion 42 responsive to the inner portion 44 being received within the outer portion 42.

In various embodiments, the inner portion 44 may have a snap fit relationship with the outer portion 42. Features located on an outer surface of the inner portion 44 and/or an inner surface of the outer portion 42 provide a radial force that may be overcome by a predefined force, such as, without limitation, a force applied by a user's thumb, thus enabling the snap fit relationship.

It will be appreciated that the structure 18 can be any type of vehicle whatsoever as desired without limitation. For example and given by way of non-limiting examples, in various embodiments the vehicle may include a motor vehicle driven by wheels and/or tracks, such as, without limitation, an automobile, a truck, a sport utility vehicle (SUV), a van. The vehicle may also be a wheel towable vehicle, such as, without limitation, a trailer, a camper, or the like. Given by way of further non-limiting examples, in various embodiments the vehicle may include a marine vessel such as, without limitation, a boat, a ship, a submarine, a submersible, an autonomous underwater vehicle (AUV), and the like. Given by way of further non-limiting examples, in various embodiments the vehicle may include an aircraft such as, without limitation, a fixed wing aircraft, a rotary wing aircraft, and a lighter-than-air (LTA) craft.

The structure 18 may also be a non-vehicular device, such as, without limitation, a residential structure, such as a house, a townhouse, a condominium, an apartment building, or the like, or a business structure such as an office building, a store, a factory, a warehouse, a hospital, or the like, or any other structure.

In various embodiments, a vehicle (18) includes a first bed wall (22), a second bed wall (24), a bed floor (26) connected between the first bed wall (22) and the second bed wall (24), a tailgate (32), and a tailgate cable assembly (36). The tailgate (32) includes a base (38) that is rotatably connected to the first bed wall (22) and the second bed wall (24). The tailgate cable assembly (36) includes a tailgate cable (37) having a first end and a second end, a first eyelet connector (41), and a second eyelet connector (40). The first eyelet connector (41) is connected to the first end of the tailgate cable (37) and the tailgate (32), The second eyelet connector (40) is connected to the second end of the tailgate cable (37) and one of the first bed wall (22) and the second bed wall (24). The second eyelet connector (40) has a predefined number of orientations. Each of the orientations results a different positions of the tailgate (32) responsive to full extension of the cable. The second eyelet connector (40) includes an eyelet (42) coupled to the tailgate cable (37) and a washer (44) received within the eyelet (42) in two or more orientations.

Figure 8:
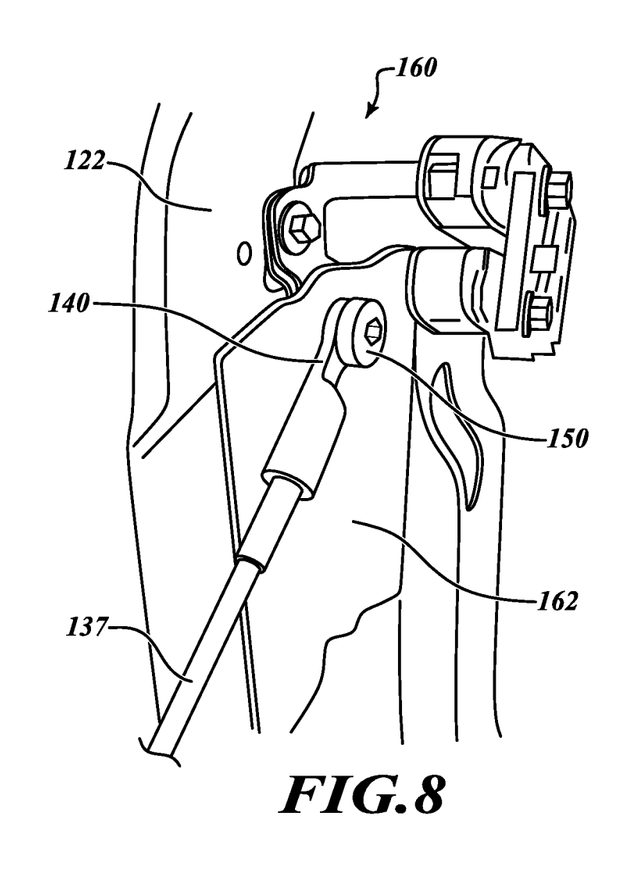
FIG. 8 is a perspective view of a portion of the panel cable assembly attached to a wall of a structure.
Figure 9:
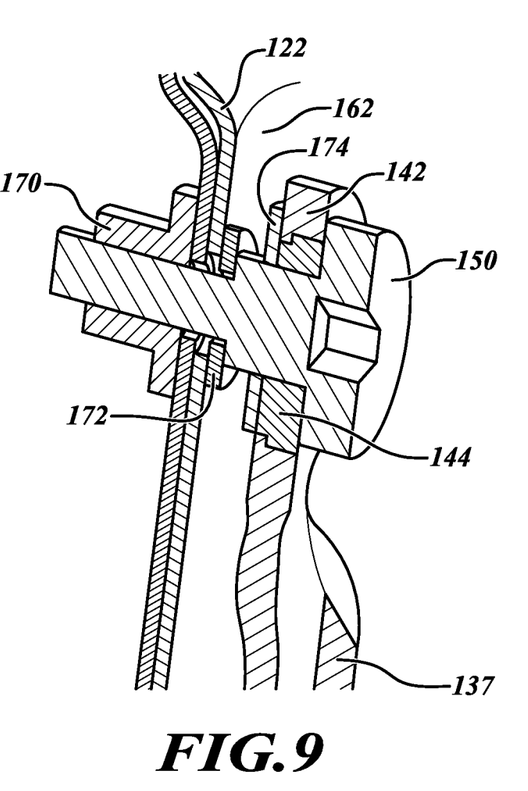
FIG. 9 is a cross-sectional, perspective view of a portion of the panel cable assembly attached to the wall of the structure of FIG. 7.

Referring to FIGS. 8 and 9, in various embodiments, a bed wall 122, similar to the walls 22, 24 of FIG. 1, includes a wall/cable connection point 160. At the wall/cable connection point 160, a shoulder bolt 150 attaches eyelet connector 140 having an eyelet 142 and an adjustable washer 144 two a mounting plate 162. The second eyelet connector 140 is mounted by a shoulder bolt 150 and nut 170 to the mounting plate 162 and the bed wall 122. The shoulder bolt 150 includes a non-shoulder section that is received through a washer 172, the mounting plate 162, and the bed wall 122. A shoulder section of the shoulder bolt 150 is received through a shoulder bolt nut washer 174. The washer 172 may be received within a cavity formed in the mounting plate 162. The shoulder bolt nut washer 174 has a diameter that is larger than the washer 172 and the cavity in the mounting plate 162 that receives the washer 172. The washer 172 may be a locking washer and/or the nut 170 may be a locking nut. When the shoulder bolt 150 is locked in place, a distance between a distal surface of a head of the shoulder bolt 150 and a facing surface of the washer 172 is just slightly greater than the combined width of the eyelet 142 and the shoulder bolt nut washer 172. This allows the eyelet connector 140 to rotate about the shoulder section of the shoulder bolt 150.

Figure 10:
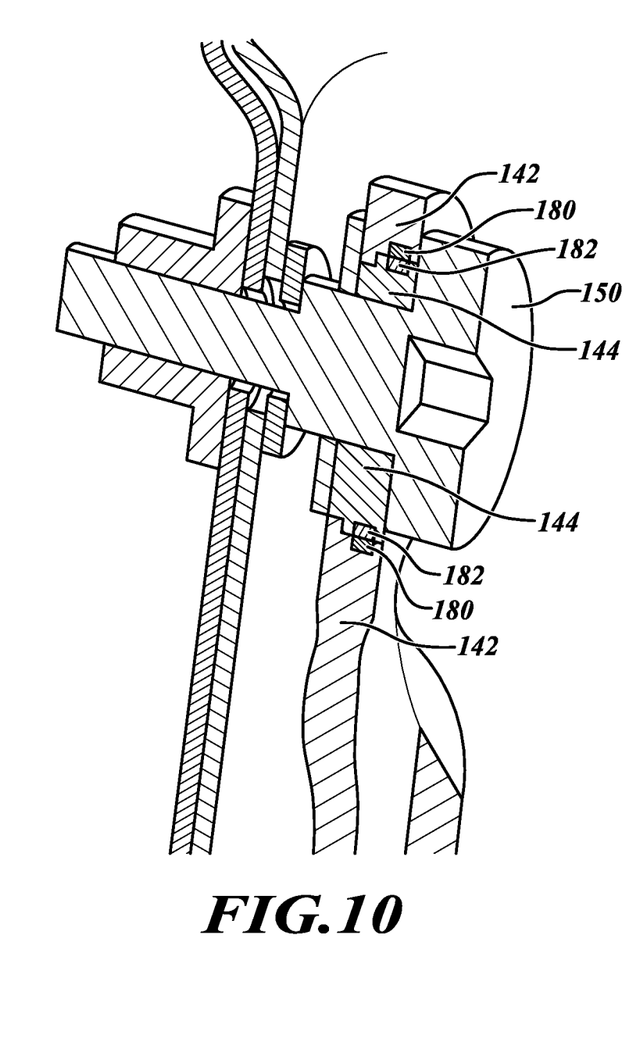
FIG. 10 is a cross-sectional, perspective view of a portion of the panel cable assembly attached to a wall of a structure.

Referring to FIG. 10, in various embodiments, the eyelet connector 140 may include one or more magnets 180 embedded into an inner wall of the hole in the eyelet connector 140. The adjustable washer 144 may include one or more magnets 182 embedded in an outer surface of the adjustable washer 144. The magnets 180 and 182 longitudinally when the adjustable washer 144 is received within the eyelet connector 140. The magnets 180 and 182 have opposite polarity, thereby creating an attraction force between the magnets 180 and 182 and thus between the adjustable washer 144 and the eyelet connector 140. The strength of the magnets 180 and 182 is chosen to allow a user to extract the adjustable washer 144 from the eyelet connector 140 without having to apply an extreme amount of force to the adjustable washer 144.

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A panel system comprising:
   a panel configured to rotatably connect to a structure; and
   a panel cable assembly including:
      a first cable including a first end and a second end;
      a first connector couplable to the first end of the first cable and a component chosen from the panel and the structure; and
      a second connector couplable to the second end of the first cable and a component chosen from the panel and the structure, the second connector is configured to have a predefined number of orientations, the second connector includes:
         an outer portion coupled to the first cable; and
         an inner portion received within the outer portion in one of the predefined number of orientations, wherein the inner portion is oval-shaped,
         wherein each of the predefined number of orientations results in a different distance value between the panel and the structure responsive to full extension of the first cable.

2. The panel system of claim 1, wherein the panel cable assembly further includes:
   a second cable;
   a third connector couplable to a first end of the second cable and a component chosen from the panel and the structure; and
   a fourth connector couplable to the second end of the second cable and a component chosen from the panel and the structure, the fourth connector is configured to have a predefined number of orientations, the fourth connector includes:
      an outer portion coupled to the second cable; and
      an inner portion received within the outer portion in one of the predefined number of orientations,
      wherein each of the predefined number of orientations results in a different distance value between the panel and the structure responsive to full extension of the second cable.

3. The panel system of claim 1, wherein the inner portion includes a hole configured to receive a fastener, the hole being disposed closer to a first end than a second end of the inner portion.

4. The panel system of claim 1, wherein the inner portion includes an annular extension and the outer portion includes an annular relief configured to receive the annular extension of the inner portion.

5. The panel system of claim 1, wherein the inner portion has a snap fit relationship with the outer portion.

6. The panel system of claim 1, wherein a top surface of the inner portion is flush with a top surface of the outer portion responsive to the inner portion being received within the outer portion.

7. A structure comprising:
   a first wall;
   a second wall;
   a base connected between the first wall and the second wall; and
   a panel system comprising:
      a panel including a base configured to rotatably connect to the first wall and the second wall; and
      a panel cable assembly including:
         a first cable including a first end and a second end;
         a first connector couplable to the first end of the first cable and a component chosen from the panel and the first wall; and
         a second connector couplable to the second end of the first cable and a component chosen from the panel and the first wall, the second connector is configured to have a predefined number of orientations, the second connector includes:
            an outer portion coupled to the first cable; and
            an inner portion received within the outer portion in one of the predefined number of orientations, wherein the inner portion is oval-shaped,
            wherein each of the predefined number of orientations results in a different distance value between the panel and the first wall responsive to full extension of the first cable.

8. The structure of claim 7, wherein the panel cable assembly further includes:
   a second cable;
   a third connector couplable to a first end of the second cable and a component chosen from the panel and the second wall; and
   a fourth connector couplable to a second end of the second cable and a component chosen from the panel and the second wall, the fourth connector is configured to have a predefined number of orientations, the fourth connector includes:
      an outer portion coupled to the second cable; and
      an inner portion received within the outer portion in one of the predefined number of orientations,
      wherein each of the predefined number of orientations results in a different distance value between the panel and the second wall responsive to full extension of the second cable.

9. The structure of claim 7, wherein the inner portion includes a hole configured to receive a fastener, the inner portion includes a hole disposed closer to a first end than a second end of the inner portion.

10. The structure of claim 7, wherein the inner portion includes an annular extension and the outer portion includes an annular relief configured to receive the annular extension of the inner portion.

11. The structure of claim 7, wherein the inner portion has a snap fit relationship with the outer portion.

12. The structure of claim 7, wherein a top surface of the inner portion is flush with a top surface of the outer portion responsive to the inner portion being received within the outer portion.

13. A vehicle comprising:
a first bed wall;
a second bed wall;
a bed connected between the first bed wall and the second bed wall;
a tailgate including a base configured to rotatably connect to first bed wall and the second bed wall; and
a tailgate cable assembly including:
a first cable including a first end and a second end;
a first eyelet connector couplable to the first end of the first cable and a component chosen from the tailgate and the first bed wall; and
a second eyelet connector couplable to the second end of the first cable and a component chosen from the tailgate and the first bed wall, the second eyelet connector is configured to have a predefined number of orientations, the second eyelet connector includes:
an eyelet coupled to the first cable; and
a washer received within the eyelet in one of the predefined number of orientations, wherein the washer includes an annular extension and the eyelet includes an annular relief configured to receive the annular extension of the washer, wherein each of the predefined number of orientations results in different positions of the tailgate respective to the first bed wall responsive to full extension of the first cable.

14. The vehicle of claim 13, wherein the tailgate cable assembly further includes:
a second cable;
a third eyelet connector couplable to a first end of the second cable and a component chosen from the tailgate and the second bed wall; and
a fourth eyelet connector couplable to a second end of the second cable and a component chosen from the tailgate and the second bed wall, the four eyelet connector is configured to have a predefined number of orientations, the second eyelet connector includes:
an eyelet coupled to the second cable; and
a washer received within the eyelet in one of the predefined number of orientations, wherein each of the predefined number of orientations results in a different distance value between the panel and the second bed wall responsive to full extension of the second cable.

15. The vehicle of claim 13, wherein the washer is oval-shaped.

16. The vehicle of claim 13, wherein the washer has a snap fit relationship with the eyelet.

17. The vehicle of claim 13, wherein a top surface of the washer is flush with a top surface of the eyelet responsive to the washer being received within the eyelet.

* * * * *

UNITED STATES PATENT AND TRADEMARK OFFICE
CERTIFICATE OF CORRECTION

| | |
|---|---|
| PATENT NO. | : 11,919,576 B2 |
| APPLICATION NO. | : 17/702278 |
| DATED | : March 5, 2024 |
| INVENTOR(S) | : Arun Kumar R N |

It is certified that error appears in the above-identified patent and that said Letters Patent is hereby corrected as shown below:

In the Claims

Column 8, Line 13 (Claim 14): "the four eyelet connector" should read --the fourth eyelet connector--.

Signed and Sealed this
Thirtieth Day of April, 2024

*Katherine Kelly Vidal*

Katherine Kelly Vidal
*Director of the United States Patent and Trademark Office*